(12) United States Patent
Roy et al.

(10) Patent No.: US 8,420,141 B2
(45) Date of Patent: Apr. 16, 2013

(54) PREVENTION OF SYNTHETIC COLOR FADING IN BEVERAGES USING BOTANICALLY DERIVED COLOR STABILIZERS

(75) Inventors: Glenn Roy, Beacon, NY (US); Robin Berardi, Flemington, NJ (US); Wendy Chan, Chestnut Ridge, NY (US); Thomas Lee, Scarsdale, NY (US)

(73) Assignee: PepsiCo, Inc., Purchase, NY (US)

( * ) Notice: Subject to any disclaimer, the term of this patent is extended or adjusted under 35 U.S.C. 154(b) by 1294 days.

(21) Appl. No.: 10/629,759

(22) Filed: Jul. 30, 2003

(65) Prior Publication Data

US 2004/0091589 A1    May 13, 2004

Related U.S. Application Data

(60) Provisional application No. 60/399,689, filed on Jul. 30, 2002.

(51) Int. Cl.
    *A23B 7/157*      (2006.01)

(52) U.S. Cl.
    USPC ........ 426/262; 426/265; 426/590; 426/330.3; 426/250; 426/321

(58) Field of Classification Search .................. 426/250, 426/265, 590, 330.3, 321, 262
See application file for complete search history.

(56) References Cited

U.S. PATENT DOCUMENTS

| | | | | |
|---|---|---|---|---|
| 5,079,016 A | * | 1/1992 | Tood, Jr. | 426/250 |
| 5,145,781 A | | 9/1992 | Suzuki et al. | |
| 5,314,686 A | | 5/1994 | Todd, Jr. | 424/401 |
| 5,336,510 A | * | 8/1994 | Chang | 426/72 |
| 5,443,852 A | | 8/1995 | Shahidi et al. | 426/92 |
| 5,908,650 A | * | 6/1999 | Lenoble et al. | 426/262 |
| 6,022,576 A | | 2/2000 | Cirigliano et al. | 426/597 |
| 6,036,986 A | | 3/2000 | Cirigliano et al. | 426/330.3 |
| 6,120,823 A | | 9/2000 | Cirigliano et al. | 426/321 |
| 6,287,611 B1 | | 9/2001 | Morello et al. | 426/72 |
| 6,379,729 B1 | | 4/2002 | Onishi et al. | 426/250 |
| 6,630,186 B1 | | 10/2003 | Takaichi et al. | 426/250 |
| 2002/0086093 A1 | | 7/2002 | Morello et al. | 426/72 |
| 2003/0003212 A1 | * | 1/2003 | Chien et al. | 426/548 |
| 2003/0147972 A1 | | 8/2003 | Christopher et al. | 424/725 |

FOREIGN PATENT DOCUMENTS

| | | |
|---|---|---|
| JP | 6-93199 | 4/1994 |
| JP | 2001323263 | * 11/2001 |
| JP | 2002138024 | * 5/2002 |
| WO | WO 97/36503 | 10/1997 |

OTHER PUBLICATIONS al-Sereiti Mr, Abu-Amer Km, Sen P. Pharmacology of rosemary (*Rosmarinus officinalis* Linn.) and its therapeutic potentials , Feb. 1999 http://www.ncbi.nlm.nih.gov/entrez/query.fcgi?db=pubmed &cmd=Retrieve&dopt=AbstractPlus&list_uids=10641130 &query_hl=2&itool=pubmed_docsum.*

Coffee: Related Beverages, Edited by Clarke, R. J. and Macrae, R. Elsevier Applied Science, 1987, pp. 1, 2, 12, 16.* http://web.archive.org/web/20020612072429/http://www.mc.vanderbilt.edu/coffee/chemical.html ICS Research (Institute for Coffee Studies).*

Horn-Ross, P. L. Sources of Phytoestrogen Exposure among Non-Asian Women in California, USA Cancer Causes & Control, vol. 11, No. 4. (Apr. 2000), pp. 299-302. Stable URL: http://links.jstor.org/sici?sici=0957-5243%28200004%2911%3A4%3C299%3ASOPEAN%3E2.0.CO%3B2-8.*

B. Buszewski, et al., "Simultaneous Isolation of Rutin and Esculin from Plant Material and Drugs Using Solid-Phase Extraction", J. Pharm. Biomed. Anal., vol. 11, No. 3, pp. 211-215 (1993).

J. G. Sweeny, et al., "Effect of Flavonoid Sulfonates on the Photobleaching of Anthocyanins in Acid Solution", J. Agric. Food Chem., vol. 29, pp. 563-567 (1981).

M. Reisch, "Sunscreens", C & EN, p. 38, Jun. 24, 2002.

* cited by examiner

*Primary Examiner* — Vera Stulii
(74) *Attorney, Agent, or Firm* — Banner & Witcoff, Ltd.

(57) ABSTRACT

Fading of synthetically colored beverages is prevented using botanically derived color stabilizers which are $C_6$-$C_3$ phenylpropenoic carbonyl compounds which contain both (i) unsaturation and (ii) oxidation at a carbon atom.

13 Claims, No Drawings

PREVENTION OF SYNTHETIC COLOR FADING IN BEVERAGES USING BOTANICALLY DERIVED COLOR STABILIZERS

This application claims the benefit of U.S. Provisional Application No. 60/399,689, filed Jul. 30, 2002.

BACKGROUND OF THE INVENTION

1. Field of the Invention

The present invention relates to the prevention of synthetic color fading in beverages. It is directed to a food coloring composition comprising a botanically derived color stabilizer and a synthetic color, as well as to a stable synthetic colored beverage containing the same and to a method of preventing color fading by including in said beverage the same.

2. Related Background Art

Color stability is an important issue in the beverage world. Both natural and synthetic (or artificial) colors are known to fade, most typically upon exposure to UV light. When beverages are packaged in glass or polyethylene terephthalate (PET) containers, they are even more susceptible to problematic color fading. The problems associated with color fading are primarily aesthetic in nature. A once vibrant color may become dull or disappear entirely; in certain circumstances, the color may be detrimentally altered, many times taking on a brownish hue. This limits the development of a wide platform of colored beverages and decreases consumer acceptability of a colored beverage.

It is believed that oxidation and/or reduction is primarily responsible for color instability or color fading. Oxidation and/or reduction can be chemically-, light- or biologically (microbial, enzyme)-induced in a given beverage, though light is the predominant initiator. Secondary chemical initiators may be present in certain beverages; these include, without limitation, ascorbic acid, hydroxymethylfurfural (HMF) and metals; these initiators work with light to fade colors.

Colors can react with HMF and other carbohydrate degradation products to form browning compounds. The mechanism of the reaction, which is very noticeable in fruit juices, is known, and it is very temperature dependent and is hastened by the presence of oxygen.

Natural colors are typically believed to fade by an oxidative mechanism. A number of solutions for color fading with respect to natural colors have been proposed.

J. G. Sweeny, et al., have identified a molecular complex, shown below, between a natural color and a flavone which is said to account for natural color protection. J. Agric. Food Chem., vol. 29, pp. 563-567 (1981).

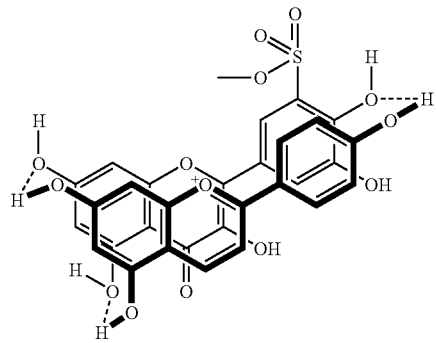

The rearward structure is the color stabilizer quercetin-5'-sulfonic acid and the forward structure is the natural color apigeninidin. The π-π ring interaction, intermolecular hydrogen bonding, and ionic interactions are all structurally dependent.

In addition, Lenoble et al. (U.S. Pat. No. 5,908,650) have proposed the combination of an anthocyanin (a natural color) and a pigment-improving agent selected from flavonoid glycuronides and glucuronides (including 8-position compounds), galacturonides and caffeic acid derivatives in order to deepen and improve the intensity of the anthocyanin and to increase its stability. Lenoble et al. rely on a "copigmentation" of natural botanical substances with natural colors to afford protection.

Further, JP 6-93199 discloses the use of chlorogenic acid, caffeic acid or ferulic acid as an anti-fading agent for natural gardenian yellow color. Todd (U.S. Pat. No. 5,314,686) discloses that rosemary, sage and thyme have color sparing properties with respect to natural colors such as annatto, bixin, paprika and carotenoids.

What is more, Chang (U.S. Pat. No. 5,336,510) discloses the use of riboflavin (vitamin $B_2$) as a color stabilizer in azo-colored beverages fortified with vitamin C. Onishi et al. (U.S. Pat. No. 6,379,729) disclose the use of a combination of sulfurous acid and sorbic acid to obtain a color stabilizing effect in foods or beverages colored with an anthocyanin, a coal tar color or carthamus yellow.

Color fading has been more thoroughly investigated with respect to natural colors (see above), as it is believed that synthetic colors are inherently more stable. However, color fading is problematic for synthetically colored beverages (see Onishi et al. above). Vendors of synthetic colors teach that such colors may fade by a reductive chemical mechanism.

Azo dyes, such as FD&C Red No. 40, comprise the largest group of certified synthetic colors. It is well-documented that azo compounds in the presence of oxidizing agents are easily converted to colorless substances. Further, azo compounds can be easily reduced in the presence of reducing agents as shown below:

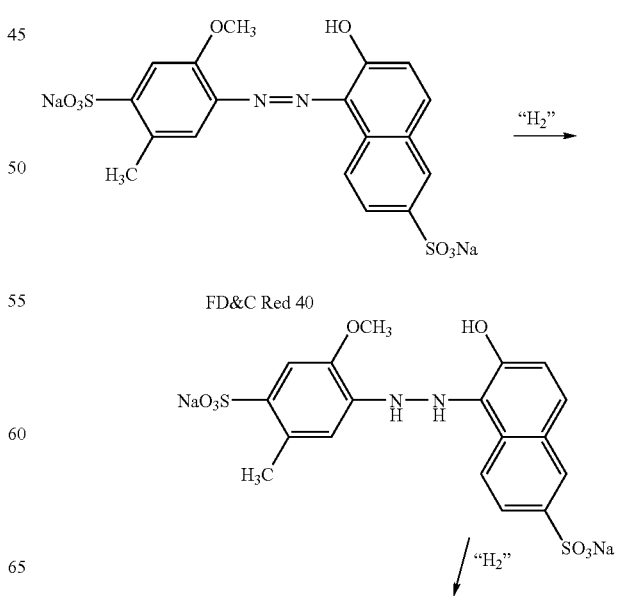

-continued

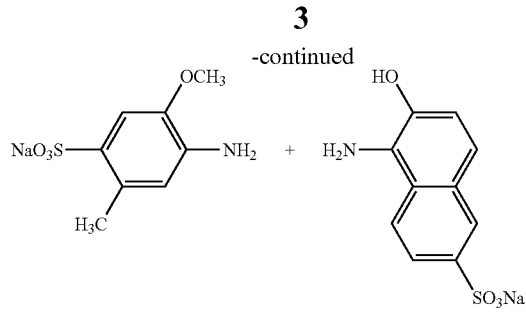

The kinetics of the reduction is dependent on the concentration of the substrate, the nature of the reducing agent and temperature.

Triphenylmethane dyes (TPM) are characterized by three aromatic rings attached to a central carbon. In organic chemistry terms, TPM dyes may also be considered "homo-iminium" and thereby possess similar electronic density behaviors to azo dyes. That is, when the electron density is distributed throughout the entire chemical structure, visible light is absorbed in the pi orbitals to create color. This is called conjugation. If electrons are added to reduce that conjugation, color is lost.

Adding credence to the theory that color fading in synthetically colored beverages occurs primarily due to a reductive mechanism, it has been found that color fading occurs more prominently in synthetic colored beverages in the absence of oxygen, i.e., <3 ppm oxygen. Such a low oxygen content is typical of most carbonated and hot-filled beverages. Hence, anti-oxidants would not be expected to stabilize synthetic colors in a low oxygen environment.

Thus, there is a need to develop a color stabilizing agent which would lessen or prevent color fading in synthetically colored beverages.

SUMMARY OF THE INVENTION

One aspect of the present invention is directed to a food coloring composition comprising a synthetic color and a botanically derived color stabilizer containing a $C_6$-$C_3$ phenylpropenoic carbonyl structure therein represented by a formula selected from the group consisting of

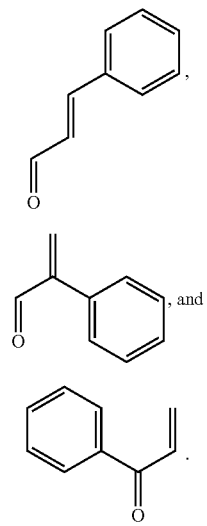

A second aspect is directed to a method of preventing color fading in a synthetically colored beverage comprising including in the beverage a color stabilizing amount of a botanically derived color stabilizer.

A third aspect of the present invention is directed to a stable colored beverage comprising a synthetic color and a color stabilizing amount of a botanically derived color stabilizer.

According to certain preferred embodiments of the present invention, the synthetic color is selected from β-Apo-8'-carotenal, canthaxanthin, β-carotene, Citrus Red No. 2, D&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, riboflavin, ultramarine blue, ultramarine green, ultramarine violet and red, and combinations thereof.

According to preferred embodiments of the present invention, the botanically derived color stabilizer is a $C_6$-$C_3$ phenylpropenoic carbonyl compound containing (i) unsaturation and (ii) oxidation at a carbon atom. In certain preferred embodiments, the $C_6$-$C_3$ phenylpropenoic carbonyl compound is selected from rosmarinic acid, chlorogenic acid, cichoric acid, caffeic acid, coumaric acid, cinnamic acid, ferulic acid, sinapic acid, caftaric acid, eichloric acid, echinacoside and combinations thereof and may optionally be provided in the form of an extract of a botanical selected from rosemary extract, green coffee bean extract, blueberry extract, rhododendron extract, sunflower kernel extract, chickory leaf extract, purple coneflower extract, lettuce extract and combinations thereof. In other preferred embodiments, the $C_6$-$C_3$ phenylpropenoic carbonyl compound is selected from cinnamoyl esters, coumarins, chalcones, flavones, chromones, isoflavones, and combinations thereof and may optionally be provided in the form of an extract of a botanical selected from horse chestnut extract, dandelion extract, eucalyptus extract, stringybark extract, saw palmetto extract, honeysuckle extract, hawthorn extract, noni fruit extract, red clover extract, orange extract, buckwheat extract, chamomile extract and combinations thereof.

In certain preferred embodiments of the present invention, a non-aryl enoic carbonyl compound selected from sorbic acid, aconitic acid, flumaric acid, maleic acid and any combination thereof is used in combination with the botanically derived color stabilizer to prevent color fading.

Certain preferred embodiments of the present invention are directed to a stable colored carbonated soft drink containing FD&C Blue No. 1 and rosmarinic acid, a stable colored lemonade containing FD&C Yellow No. 5 or 6 and green coffee bean extract, and a stable colored juice drink containing FD&C Red No. 40 and rosemary extract.

DETAILED DESCRIPTION OF THE INVENTION

Phenylpropenoic carbonyl compounds ($C_6$-$C_3$) have been found to prevent light-induced synthetic color fading in beverages. The $C_6$-$C_3$ phenylpropenoic carbonyl structure is a structural motif that is ubiquitous in the family of secondary plant metabolites and can hence be derived from a number of botanical substances. Many of these substances are currently approved for food and beverage use.

While a number of these materials may be classified as anti-oxidants and while anti-oxidants are known to stabilize natural colors, anti-oxidant activity is not necessarily a portent of synthetic color protection. In fact, some of the best anti-oxidants, namely activin (grape seed extract) which contains proanthocyanidins, resveratrol (red wine) and epigallocatechin gallate (green tea) are not effective synthetic color protectants. In addition, such materials do not contain the $C_6$-$C_3$ phenylpropenoic carbonyl moiety and, more importantly, impart unwanted color themselves. Therefore, measures of free radical scavenging ability such as ORAC (oxygen radical absorbance capacity) or DPPH (2,2-diphenyl-1-picrylhydrazyl) values are not necessarily an indicator of synthetic color protection ability. Further, because synthetic color fading is worsened in low oxygen environments, i.e., less than 3 ppm oxygen, it would be counterintuitive to use an anti-oxidant to combat synthetic color fading.

As used herein, "botanical" refers to a material that is or may be tree-, plant-, weed- or herb-derived. As used herein, "botanically derived" refers to a material capable of having been derived from a botanical, as by isolation or extraction; however, "botanically derived" is not limited in this application to materials which actually are isolated or extracted from a botanical, but also includes materials obtained commercially or synthetically. As used herein, "color fading" refers to loss of color hue or intensity. As used herein, "color stabilizing amount" refers to an amount sufficient to substantially lessen or prevent the fading or loss of color imparted by a synthetic color to a beverage. As used herein, "beverage" refers to a finished beverage, though the botanically derived color stabilizer may be added at any point in beverage manufacture, i.e., syrup, concentrate, or finished beverage, which may be contained in a glass or plastic (such as PET) container. As used herein, "stable" refers to a synthetically colored beverage which contains a botanically derived color stabilizer and which therefore exhibits substantially lessened or no color fading or loss for a period of at least twice, preferably at least two to five times, as long as a beverage which contains no botanically derived color stabilizer.

The first aspect of the present invention is directed to a food coloring composition comprising a synthetic color and a botanically derived color stabilizer.

Synthetic colors suitable for use in the present invention include, without limitation, β-Apo-8'-carotenal, canthaxanthin, β-carotene, Citrus Red No. 2, D&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, riboflavin, ultramarine blue, ultramarine green, ultramarine violet and red, and combinations thereof. Such synthetic colors are commercially available; alternatively, such synthetic colors can be synthesized according to known procedures.

Typically, a synthetic color is present in a food coloring composition of the present invention in an amount sufficient to impart an amount of added color to a beverage ranging preferably from about 0.1 ppm to about 50 ppm, and more preferably from about 1 ppm to about 15 ppm. One of ordinary skill in this art will recognize that the optimal amount of synthetic color present in a given food coloring composition is determined by factors such as overall desired color, solubility, regulatory approval, etc. One of ordinary skill is this art can readily determine the optimal amount of synthetic color for a given food coloring composition based on those factors. This invention is exceptionally effective when low color hue or intensity is used, i.e., within the range of about 1 to about 10 ppm synthetic color in the finished beverage.

The botanically derived color stabilizer of the present invention is, in its broadest sense, a $C_6$-$C_3$ phenylpropenoic carbonyl compound which contains both (i) unsaturation and (ii) oxidation at a carbon atom. The generic $C_6$-$C_3$ phenylpropenoic carbonyl structure can be represented by any of isomeric formulae (Ia), (Ib) and (Ic) below:

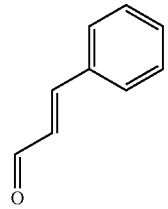
(Ia)

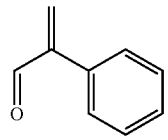
(Ib)

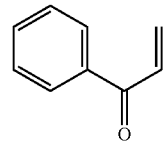
(Ic)

Any compound possessing such a structure alone or as part of a larger structure is suitable for use as a $C_6$-$C_3$ phenylpropenoic carbonyl compound, i.e., a botanically derived color stabilizer, of the present invention. Removing the styryl unsaturation results in a loss of color fading protection; similarly, lowering the oxidation state of the acid to an alcohol also results in a lowered color fading protection. The botanically derived color stabilizers may be commercially available, may be synthesized according to known procedures or may be supplied by or isolated from known botanicals or extracts thereof. A representative extraction procedure includes the one disclosed by B. Buszewski, et al., J. Pharm. Biomed. Anal., vol. 11, no. 3, p. 211-215 (1993).

In certain embodiments of the present invention, $C_6$-$C_3$ phenylpropenoic carbonyl compounds suitable for use in the present invention include, without limitation, rosmarinic acid, chlorogenic acid, cichoric acid, caffeic acid, coumaric acid, cinnamic acid, ferulic acid, sinapic acid, caftaric acid, eichloric acid, echinacoside and combinations thereof. It is clear from the structures set forth below that the generic structure (Ia) is present in materials such as rosmarinic acid, chlorogenic acid, and cichoric acid.

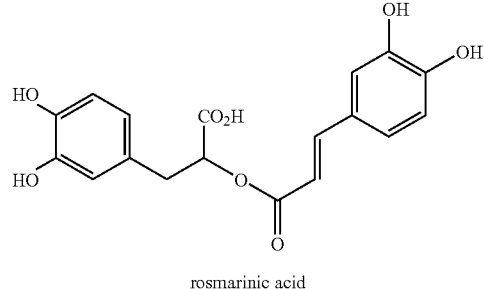
rosmarinic acid

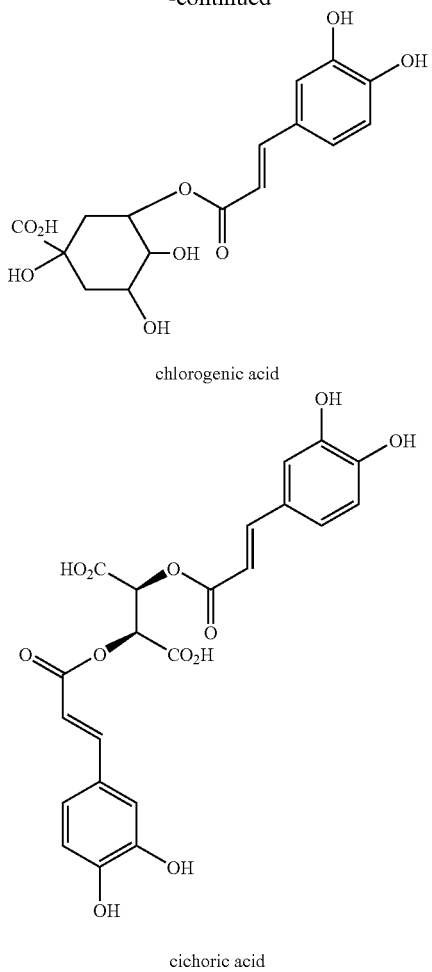

chlorogenic acid cichoric acid

It is also clear from the structures of these substances that substitution of the generic $C_6$-$C_3$ phenylpropenoic carbonyl structure (Ia), and for that matter substitution of structures (Ib) and (Ic), so long as both unsaturation near and oxidation at a carbon atom remain, is intended. In fact, substitution is necessary to obtain a wide range of suitable color stabilizers. Suitable substituents include, without limitation, hydroxyl, methoxyl, and others as usually found in plant metabolite phenols. Further, it can be readily appreciated that cichoric acid may well be a more effective color stabilizer than some of the other listed acids, given the presence of two structures (Ia) therein. Generally, it is found that the addition of hydroxyl groups on the aryl rings enhances color stabilization. Hence, color stabilization ability of caffeic acid (2 hydroxyl groups)>ferulic acid>coumaric acid>cinnamic acid (no hydroxyl groups) is observed.

In certain preferred embodiments of the present invention, the above-listed $C_6$-$C_3$ phenylpropenoic carbonyl compound of the botanically derived color stabilizer is provided via an extract of a botanical. Extracts suitable for use in the present invention include, without limitation, rosemary extract, green coffee bean extract, blueberry extract, rhododendron extract, sunflower kernel extract, chickory leaf extract, purple coneflower extract, lettuce extract and combinations thereof. More generally, extracts of botanicals in any of the labiatae, ericaceae or asteraceae families are suitable for use. As can be seen in Table 1 below, each of the above-noted extracts contains one or more $C_6$-$C_3$ phenylpropenoic carbonyl compounds which serve as a botanically derived color stabilizer.

TABLE 1

| common name | species | $C_6$-$C_3$ phenylpropenoic carbonyl compound(s) |
|---|---|---|
| rosemary | Rosmarinus officinalis | rosmarinic acid |
| green coffee bean | Coffea arabica | chlorogenic acid |
| blueberry | Vaccinium vulgaris | chlorogenic acid |
| rhododendron | Rhododendron caucasicum (Ungern) | chlorogenic acid |
| sunflower kernel | Helianthus annuus | chlorogenic acid |
| chickory leaves | Cichorium intybus | cichoric acid |
| purple coneflower | Echinacea angustifolia | echinacoside, cichoric acid, caftaric, eichloric acid |
| purple coneflower | Echinacea purpurea (Moench) | cichoric acid, chlorogenic acid, echinacoside |
| lettuce | Lactuca sativa | cichoric acid |

One of ordinary skill in this art will readily appreciate that the amount of a $C_6$-$C_3$ phenylpropenoic carbonyl compound present in a given extract will vary. Different species by nature may possess varying amounts of a $C_6$-$C_3$ phenylpropenoic carbonyl compound. The amount may also vary depending on the stage of development of a given botanical. As an illustration, Table 2 below shows the variation in chlorogenic acid and echinacoside content in the 'Magical Ruth' cultivar of Echinacea purpurea.

TABLE 2

Variations in the content of echinacoside and chlorogenic acid in flower heads of Echinacea purpurea cultivar 'Magical Ruth'*.

| | Hydrophilic components (%) | |
|---|---|---|
| Flower stage | Chlorogenic acid | Echinacoside |
| I (early) | 0.060 | 0.012 |
| II (medium) | 0.024 | 0.022 |
| III (mature) | 0.023 | 0.015 |
| IV (overblown) | 0.020 | 0.016 |

*results are obtained from 20 plants replicated three times; W. Letchamo, et al., "Cichoric Acid . . . in Echinacea purpurpea as Influenced by Flower Developmental Stages", Perspectives on New Crops and New Uses, J. Janick, ed., ASHS Press, Alexandria, VA, pp. 494-498 (1999).

In addition, the cichoric acid content of 'Magical Ruth' varies from 4.67% at stage I to 1.42% at stage IV. So it would seem that early cultivation would provide the richest extract of desirable color stabilizers.

Other $C_6$-$C_3$ phenylpropenoic carbonyl compounds suitable for use in the present invention include, without limitation, cinnamoyl esters, coumarins, chalcones, flavones, chromones, isoflavones, and combinations thereof. Many of these types of compounds can be derived from a group of known natural products called flavonoids, which are found in fruits, vegetables, nuts, seeds and flowers, as well as in teas and wines; flavonoids have demonstrated many biological and pharmacological acitivities such as anti-bacterial, anti-fungal, anti-viral, anti-oxidant, anti-inflammatory, anti-mutagenic and anti-allergic and inhibitory activities on several enzymes. As can be seen from structures below, each of cinnamoyl esters (II), coumarins (III), chalcones (IV) and flavones (V) incorporates the generic $C_6$-$C_3$ structure (Ia), chromones (VI) incorporate the generic $C_6$-$C_3$ structure (Ic) and isoflavones (VII) incorporate the generic $C_6$-$C_3$ structure (Ib).

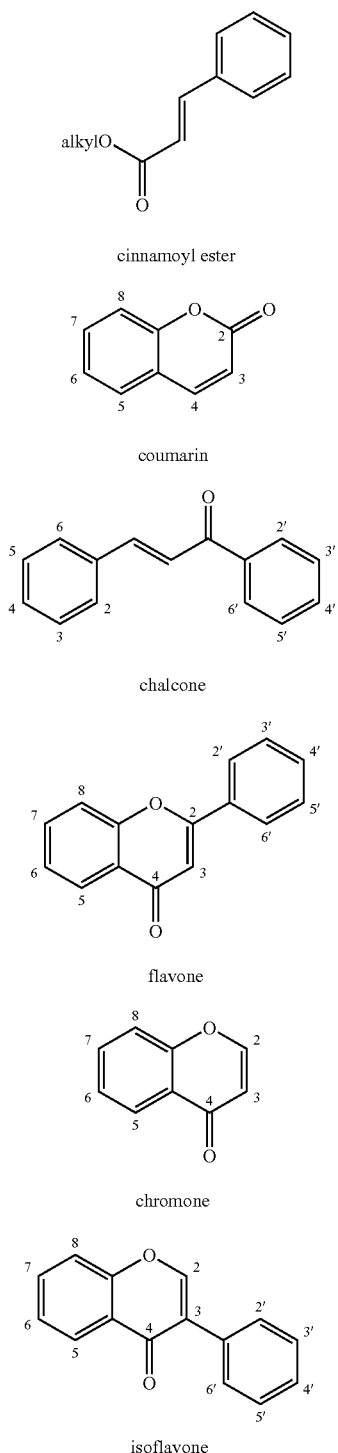

cinnamoyl ester (II)

coumarin (III)

chalcone (IV)

flavone (V)

chromone (VI)

isoflavone (VII)

Cinnamoyl esters (flavors) suitable for use in the present invention include, without limitation, cinnamyl formate, cinnamyl acetate, ethyl cinnamate, cinnamyl propionate, cinnamyl alpha-toluate, cinnamyl 2-amino benzoate, cinnamyl anthranilate, cinnamyl benzoate, cinnamyl beta-phenyl acrylate, cinnamyl butyrate, cinnamyl cinnamate, cinnamyl isobutyrate, cinnamyl isovalerate, cinnamyl methyl ketone, cinnamyl ortho-amino benzoate, cinnamyl phenyl acetate, cinnamyl 3-phenyl propenoate and combinations thereof. It is clear that substitution on the generic structure (II), so long as both unsaturation near and oxidation at a carbon atom remain, is intended. In fact, substitution is necessary to obtain a wide range of suitable color stabilizers. Suitable substituents for the generic structure (II) include, without limitation, any alkyl group including linear, non-linear, cyclic and acyclic alkyls, as well as unsubstituted and substituted alkyls.

Coumarins suitable for use in the present invention include, without limitation, coumarin, coumestrol, dalbergin, daphnetin, esculetin, citropten, noralbergin, umbelliferone, scopoletin, xanthotoxol, psoralen, bergapten, fraxetin and combinations thereof. It is clear that substitution on the generic structure (III), so long as both unsaturation near and oxidation at a carbon atom remain, is intended. In fact, substitution is necessary to obtain a wide range of suitable color stabilizers. Suitable substituents for the generic structure (I) include, without limitation, OH, $OCH_3$, $C_6H_4O_2$, Ph and $CH_2$=CHO. Table 3 below sets forth the substituents present for the above-listed coumarin compounds suitable for use in the present invention.

TABLE 3

Exemplary coumarins with substituent positions.

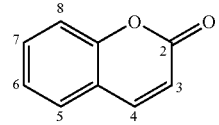

coumarin (III)

| name | substituent position | | | | | |
|---|---|---|---|---|---|---|
| | 3 | 4 | 5 | 6 | 7 | 8 |
| coumestrol | $C_6H_4O_2$ | | | | OH | |
| dalbergin | | Ph | | OH | $OCH_3$ | |
| daphnetin | | | | | OH | OH |
| esculetin | | | | OH | OH | |
| citropten | | | $OCH_3$ | | $OCH_3$ | |
| noralbergin | | Ph | | OH | OH | |
| umbelliferone | | | | | OH | |
| scopoletin | | | | $OCH_3$ | OH | |
| xanthotoxol | | | | | $CH_2$=CHO | OH |
| psoralen | | | | | $CH_2$=CHO | |
| bergapten | | | $OCH_3$ | | $CH_2$=CHO | |
| fraxetin | | | | $OCH_3$ | OH | OH |

*Ph = phenyl
**blank box = H

Chalcones suitable for use in the present invention include, without limitation, chalcone, polyhydroxychalcones, butein, phloridzin, echinatin, marein, isoliquiritigenin, phloretin and combinations thereof. It is clear that substitution on the generic structure (IV), so long as both unsaturation near and oxidation at a carbon atom remain, is intended. In fact, substitution is necessary to obtain a wide range of suitable color stabilizers. Suitable substituents for the generic structure (IV) include, without limitation, OH, $OCH_3$ and OGlc. Table 4 below sets forth the substituents present for the above-listed chalcone compounds suitable for use in the present invention.

TABLE 4

Exemplary chalcones with substituent positions.

chalcone (IV)

[structure of chalcone with positions 2,3,4,5,6 on left ring and 2',3',4',5',6' on right ring, connected by CH=CH-C(=O)]

| name | 2 | 3 | 4 | 2' | 3' | 4' | 6' |
|---|---|---|---|---|---|---|---|
| butein | | OH | OH | OH | | OH | |
| phloridzin | | | OH | OGlc | | OH | OH |
| echinatin | OCH₃ | | OH | | | OH | |
| marein | | OH | OH | OH | OH | OGlc | |
| isoliquiritigenin | OH | | OH | | | OH | |
| phloretin | | | OH | OH | | OH | OH |

*Glc = glucose
**blank box = H

Flavones suitable for use in the present invention include, without limitation, rhoifolin, diosmin, apiin, apigenin, myricetin, kaempferol, luteolin, morin, neodiosmin, quercetin, rutin, balcalein, cupressuflavone, datiscetin, diosmetin, fisetin, galangin, gossypetin, geraldol, hinokiflavone, scutellarein, flavonol, primuletin, pratol, robinetin, quercetagetin, (OH)₄ flavone, tangeritin, sinensetin, fortunelin, kampferide, chrysoeriol, isorhamnetin, vitexin and combinations thereof.

Flavones are primarily bitter, e.g., quercetin, and insoluble. However, at the use levels of the botanically derived color stabilizers, the normally associated bitter tastes are not perceived in the utilized beverage matrices due to the phenomenon of mixture suppression of bitterness by the formulated sweetness and sourness. The maximally preferred use levels of all botanically derived color stabilizers is governed by their solubility in the desired beverage matrices as determined by routine experimentation.

It is clear from the structures set forth below that generic structure (V) is present in materials such as rhoifolin and rutin.

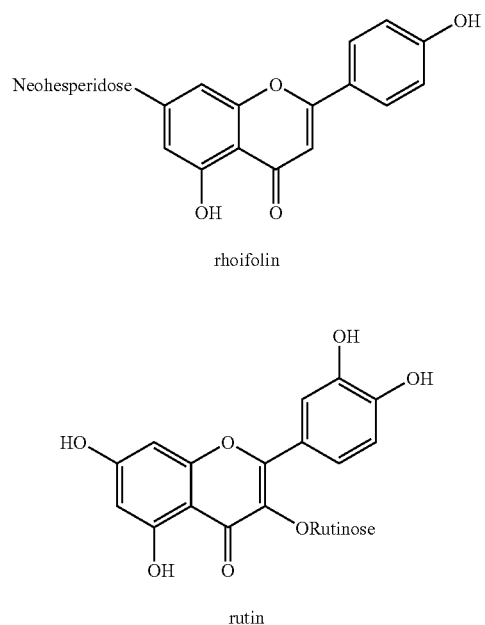

rhoifolin rutin

It is also clear from the structures of these flavones that substitution on the generic structure (V), so long as both unsaturation near and oxidation at a carbon atom remain, is intended. In fact, substitution is necessary to obtain a wide range of suitable color stabilizers. Suitable substituents include, without limitation, OH, ORut, OApioGlc, ONeoHesp, dimer, OCH₃ and OGlc. Table 5 below sets forth the substituents present for the above-listed flavone compounds suitable for use in the present invention.

TABLE 5

Exemplary flavones with substituent positions.

flavone (V)

[structure of flavone with positions 3,5,6,7,8 on left bicyclic and 2',3',4',5',6' on right ring]

| name | 3 | 5 | 6 | 7 | 8 | 2' | 3' | 4' | 5' |
|---|---|---|---|---|---|---|---|---|---|
| rhoifoin | | OH | | ONeoHesp | | | | OH | |
| diosmin | | OH | | ORut | | | OH | OCH₃ | |
| apiin | | OH | | OApioGlc | | | | OH | |
| apigenin | | OH | | OH | | | | OH | |
| myricetin | OH | OH | | OH | | | OH | OH | OH |
| kaempferol | OH | OH | | OH | | | | OH | |
| luteolin | | OH | | OH | | | OH | OH | |
| morin | OH | OH | | OH | | OH | | OH | |
| neodiosmin | | OH | | ONeoHesp | | | OH | OCH₃ | |

TABLE 5-continued

Exemplary flavones with substituent positions.

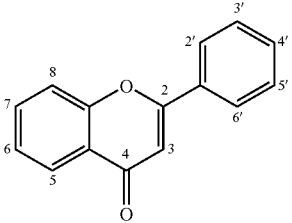 [SMILES: O=c1cc(-c2ccccc2)oc2ccccc12]

flavone (V)

| name | 3 | 5 | 6 | 7 | 8 | 2' | 3' | 4' | 5' |
|---|---|---|---|---|---|---|---|---|---|
| quercetin | OH | OH |  | OH |  |  | OH | OH |  |
| rutin | ORut | OH |  | OH |  |  | OH | OH |  |
| balcalein |  | OH | OH | OH |  |  |  |  |  |
| cupressuflavone |  | OH |  | OH | dimer |  |  | OH |  |
| datiscetin | OH | OH |  | OH | OH |  |  |  |  |
| diosmetin |  | OH |  | OH |  |  | OH | OCH$_3$ |  |
| fisetin | OH |  |  | OH |  |  | OH | OH |  |
| galangin | OH | OH |  | OH |  |  |  |  |  |
| gossypetin | OH | OH |  | OH | OH |  | OH | OH |  |
| geraldol | OH |  |  | OH |  |  | OH | OCH$_3$ |  |
| hinokiflavone |  | OH | OGlc | OH |  |  | OH | OH |  |
| scutellarein |  | OH | OH | OH |  |  |  | OH |  |
| flavonol | OH |  |  |  |  |  |  |  |  |
| primuletin |  | OH |  |  |  |  |  |  |  |
| pratol |  |  |  | OH |  |  |  | OCH$_3$ |  |
| robinetin | OH |  |  | OH |  |  | OH | OH | OH |
| quercetagetin | OH | OH | OH | OH |  |  | OH | OH |  |
| (OH)$_4$flavone |  |  |  | OH | OH |  | OH | OH |  |
| tangeritin |  | OCH$_3$ | OCH$_3$ | OCH$_3$ | OCH$_3$ |  |  | OCH$_3$ |  |
| sinensetin |  | OCH$_3$ | OCH$_3$ | OCH$_3$ |  |  | OCH$_3$ | OCH$_3$ |  |
| fortunelin |  | OH |  | OH |  |  |  | OCH$_3$ |  |
| kampferide | OH | OH |  | OH |  |  |  | OCH$_3$ |  |
| chrysoeriol | OH | OH |  | OH |  |  | OCH$_3$ | OH |  |
| isorhamnetin | OH | OH |  | OH |  |  | OH | OCH$_3$ |  |
| vitexin |  | OH |  | OH | Glc |  |  | OH |  |

*Rut = rutinose; NeoHesp = neohesperidose; ApioGlc = apiose-glucose; Glc = glucose
**blank box = H Chromones such as chromone is suitable for use in the present invention. It is clear that substitution on the generic structure (VI), so long as both unsaturation near and oxidation at a carbon atom as in (Ic) remain, is intended. In fact, substitution is necessary to obtain a wide range of suitable color stabilizers. Suitable substituents for the generic structure (VI) include, without limitation, OH, OCH$_3$, OGlc, and the like.

Isoflavones suitable for use in the present invention include, without limitation, daidzin, daidzein, biochamin A, prunetin, genistin, glycitein, glycitin, genistein, 6,7,4'-tri(OH)isoflavone, 7,3',4'-tri(OH)isoflavone and combinations thereof. It is clear that substitution on the generic structure (VII), so long as both unsaturation near and oxidation at a carbon atom as in (Ib) remain, is intended. In fact, substitution is necessary to obtain a wide range of suitable color stabilizers. Suitable substituents for the generic structure (VII) include, without limitation, OH, OCH$_3$ and OGlc. Table 6 below sets forth the substituents present for the above-listed isoflavone compounds suitable for use in the present invention.

TABLE 6

Exemplary isoflavones with substituent positions.

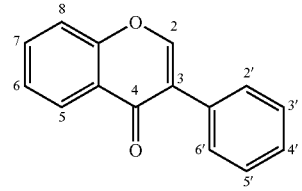 [SMILES: O=c1c(-c2ccccc2)coc2ccccc12]

(VII)

| name | 5 | 6 | 7 | 3' | 4' |
|---|---|---|---|---|---|
| daidzin |  |  | OGlc |  | OH |
| daidzein |  |  | OH |  | OH |
| biochamin A | OH |  | OH |  | OCH$_3$ |
| prunetin | OH |  | OCH$_3$ |  | OH |
| genistin | OH |  | OGlc |  | OH |
| glycitein |  | OCH$_3$ | OH |  | OH |
| glycitin |  | OCH$_3$ | OGlc |  | OH |
| genistein | OH |  | OH |  | OH |
| 6,7,4'-tri(OH)isoflavone |  | OH | OH |  | OH |
| 7,3',4'-tri(OH)isoflavone |  |  | OH | OH | OH |

*Glc = glucose
**blank box = H

In certain preferred embodiments of the present invention, the above-noted $C_6$-$C_3$ phenylpropenoic carbonyl compounds having any of generic structures (II) through (VII) can be supplied via an extract of a botanical. Extracts suitable for use in the present invention include, without limitation, horse chestnut, dandelion, eucalyptus, stringybark, saw palmetto, honeysuckle, hawthorn, noni fruit, red clover, orange, buckwheat, chamomile and combinations thereof. As can be seen in Table 7 below, each of the above-noted extracts contains one or more $C_6$-$C_3$ phenylpropenoic carbonyl compounds which serve as a botanically derived color stabilizer.

TABLE 7

| common name | species | $C_6$-$C_3$ phenylpropenoic carbonyl compound(s) |
|---|---|---|
| horse chestnut | Aesculus hippocastanum | rutin, esculetin |
| dandelion | Taraxacum | esculetin |
| eucalyptus | Eucalyptus obliqua | rutin, esculetin |
| red stringybark | E. macrohyncha | rutin, esculetin |
| saw palmetto (sabal or shrub palmetto) | Serenoa repens in Family Arecaceae | isoquercitrin, kaempferol-3-O-glucosides, rhoifolin |
| honeysuckle | Lonicera japonica | luteolin, quercetin, astragalin, isoquercitrin, diosmetin 7-O-glucoside, rhoifolin, lonicerin |
| hawthorn | Crataegus specie | vitexin |
| noni fruit | Morinda citrifolia | morin, rutin |
| red clover | Trifolium pratense | isoflavones |
| orange | Citrus sinensis | rutin, flavones, chalcones, coumarins |
| grapefruit | | rhoifolin, isorhoifolin |
| citrumelo | P. trifoliata x C. paradisi | rutin, isorhoifolin, rhoifolin |
| attani, pummelo, sour, orange, lemelo, Natsudaidai orange | | rhoifolin |
| buckwheat | Fagopyrum specie | rutin |
| chamomile | Anthemis specie | apigenin-7-glucoside |

As noted above with regard to the botanicals of Table 1, one of ordinary skill in this art will readily appreciate that the amount of a $C_6$-$C_3$ phenylpropenoic carbonyl compound present in a given extract will vary. Different species by nature may possess varying amounts of a $C_6$-$C_3$ phenylpropenoic carbonyl compound. The amount may also vary depending on the stage of development of a given botanical or the portion of the botanical from which the extraction is performed. For example, for many of the citrus fruits, higher concentrations of flavones and flavonols occur in the leaves than in the flavedo, albedo and juice vesicles.

Typically, any of the above-noted botanically derived color stabilizers (generic structures (Ia) through (VII)) is present in a food coloring composition of the present invention in an amount sufficient to provide an amount of stabilizer in a beverage ranging preferably from about 10 to about 500 ppm, more preferably from about 50 ppm to about 300 ppm, and more preferably from about 100 ppm to about 200 ppm. When the botanically derived color stabilizer is supplied via an extract of a botanical, the extract is present in a food coloring composition of the present invention in an amount sufficient to provide an amount of stabilizer in a beverage in the same amounts noted above. It is important to note that extracts may have varying amounts of stabilizer contained therein. For example, an extract may contain 5% active ingredient or stabilizer; accordingly, the use of 500 ppm of the extract would result in the use of 25 ppm of the stabilizer.

In a preferred embodiment of the present invention, the food coloring composition further comprises a non-aryl enoic carbonyl compound selected from sorbic acid, aconitic acid, fumaric acid, maleic acid or any combination thereof. Aconitic acid is roughly ten times more effective than sorbic acid, i.e., obtains the same effect with about one-tenth the amount added. When present, a non-aryl enoic carbonyl compound is typically present in a food coloring composition of the present invention in an amount sufficient to provide an amount of non-aryl enoic carbonyl compound in a beverage ranging preferably from about 10 to about 200 ppm, and more preferably from about 25 ppm to about 100 ppm.

A second aspect of the present invention is directed to a method of preventing color fading in a synthetically colored beverage comprising the step of including in said beverage a color stabilizing amount of a botanically derived color stabilizer.

Beverages include, without limitation, carbonated soft drinks, fountain beverages, frozen ready-to-drink beverages, coffee beverages, tea beverages, powdered soft drinks, as well as liquid concentrates, flavored waters, vitamin-enhanced waters, fruit juice and fruit juice flavored drinks, sport drinks and alcoholic products. The beverage may be carbonated or noncarbonated. The beverage may be hot-filled.

The synthetically colored beverage may be colored by virtue of the presence of one or more of the above-noted synthetic colors. Additionally, the botanically derived color stabilizer is also the same as described above with respect to the first aspect of the present invention. Both the synthetic color and the botanically derived color stabilizer may be provided to the beverage in the form of a food coloring composition according to the first aspect of the present invention. The food coloring composition may be included at any stage of beverage manufacture, i.e., syrup, concentrate, finished beverage.

As noted above, a "color stabilizing amount" refers to an amount sufficient to substantially lessen or prevent the fading or loss of color imparted by a synthetic color to a beverage. Typically, a botanically derived color stabilizer is added to a synthetically colored beverage in an amount ranging preferably from about 10 to about 500 ppm, more preferably from about 50 ppm to about 300 ppm, and most preferably from about 100 ppm to about 200 ppm. When the botanically derived color stabilizer is supplied via an extract of a botanical, the extract is present in a food coloring composition of the present invention in an amount sufficient to provide an amount of stabilizer in a beverage in the same amounts noted above.

Optionally, the method of preventing color fading in a synthetically colored beverage according to the present invention further comprises the step of including in said beverage a non-aryl enoic carbonyl compound selected from sorbic acid, aconitic acid, fumaric acid, maleic acid, or any combination thereof. When present, a non-aryl enoic carbonyl compound is typically added to a beverage in an amount ranging preferably from about 10 to about 200 ppm, and more preferably from about 25 ppm to about 100 ppm.

A third aspect of the present invention is directed to a stable colored beverage comprising a synthetic color and a color stabilizing amount of a botanically derived color stabilizer. Both the synthetic color and the botanically derived color stabilizer may be provided to the beverage in the form of a food coloring composition according to the first aspect of the present invention. The stable colored beverage of the third aspect of the present invention may optionally contain a non-aryl enoic carbonyl compound selected from sorbic acid, aconitic acid, fumaric acid, maleic acid, or any combination thereof. The amounts of each of the synthetic color, the botanically derived color stabilizer and the non-aryl enoic carbonyl compound are as described above with respect to the first and second aspects of the invention.

In a preferred embodiment of the third aspect of the present invention, the stable colored beverage is a carbonated soft drink containing FD&C Blue No. 1 as the synthetic color and rosmarinic acid as the botanically derived color stabilizer. In this embodiment, FD&C Blue No. 1 is typically present in an amount of about 6.25 ppm based on finished beverage and rosmarinic acid is typically present in an amount ranging from 75 ppm to about 200 ppm based on finished beverage.

In another preferred embodiment of the third aspect of the present invention, the stable colored beverage is a lemonade containing FD&C Yellow No. 6 as the synthetic color and green coffee bean extract as the botanically derived color stabilizer. In this embodiment, FD&C Yellow No. 6 is typically present in an amount ranging from 1 ppm to about 10 ppm based on finished beverage and green coffee bean extract is typcially present in an amount ranging from 75 ppm to about 200 ppm based on finished beverage.

In yet another preferred embodiment of the third aspect of the present invention, the stable colored beverage is a juice drink containing FD&C Red No. 40 as the synthetic color and rosemary extract as the botanically derived color stabilizer. In this embodiment, FD&C Red No. 40 is typically present in an amount ranging from 3 ppm to about 10 ppm based on finished beverage and rosemary extract is typcially present in an amount ranging from 75 ppm to about 200 ppm based on finished beverage.

The examples which follow are intended as an illustration of certain preferred embodiments of the invention, and no limitation of the invention is implied.

EXAMPLE 1

A 3.5% by volume carbonated, HFCS-sweetened, benzoate-preserved, berry-flavored beverage (pH 3.15) containing 3.8 ppm FD&C Blue No. 1 and 10 ppm caffeic acid was prepared in a glass bottle. The beverage was then exposed to ultraviolet light in an Atlas Ci5000 Xenon Weather-Ometer (Atlas Electric Devices Co., Chicago, Ill.). The blue color only began to fade at 4 hours.

EXAMPLE 2

A 3.5% by volume carbonated, HFCS-sweetened, benzoate-preserved, berry-flavored beverage (pH 3.15) containing 3.8 ppm FD&C Blue No. 1 and 10 ppm morin was prepared in a glass bottle. The beverage was then exposed to ultraviolet light in an Atlas Ci5000 Xenon Weather-Ometer (Atlas Electric Devices Co., Chicago, Ill.). The blue color only began to fade at 4 hours.

EXAMPLE 3

A 3.5% by volume carbonated, HFCS-sweetened, benzoate-preserved, berry-flavored beverage (pH 3.15) containing 3.8 ppm FD&C Blue No. 1 and 10 ppm rutin was prepared in a glass bottle. The beverage was then exposed to ultraviolet light in an Atlas Ci5000 Xenon Weather-Ometer (Atlas Electric Devices Co., Chicago, Ill.). The blue color only began to fade at 4 hours.

COMPARATIVE EXAMPLE 1

A 3.5% by volume carbonated, HFCS-sweetened, benzoate-preserved, berry-flavored beverage (pH 3.15) containing 3.8 ppm FD&C Blue No. 1 was prepared in a glass bottle. The beverage was then exposed to ultraviolet light in an Atlas Ci5000 Xenon Weather-Ometer (Atlas Electric Devices Co., Chicago, Ill.). The blue color faded to white in 1 hour.

EXAMPLE 4

A non-carbonated, HFCS-sweetened, benzoate- and sorbate-preserved, lemonade-flavored beverage (pH 2.75) containing 1% juice, 500 ppm ascorbic acid, 1 ppm FD&C Red No. 40 and 10 ppm caffeic acid was prepared in a glass bottle. The beverage was then exposed to ultraviolet light in an Atlas Ci5000 Xenon Weather-Ometer (Atlas Electric Devices Co., Chicago, Ill.). The red color only began to fade at 4 hours.

EXAMPLE 5

A non-carbonated, HFCS-sweetened, benzoate- and sorbate-preserved, lemonade-flavored beverage (pH 2.75) containing 1% juice, 500 ppm ascorbic acid, 1 ppm FD&C Red No. 40 and 10 ppm rutin was prepared in a glass bottle. The beverage was then exposed to ultraviolet light in an Atlas Ci5000 Xenon Weather-Ometer (Atlas Electric Devices Co., Chicago, Ill.). The red color only began to fade at 4 hours.

EXAMPLE 6

A non-carbonated, HFCS-sweetened, benzoate- and sorbate-preserved, lemonade-flavored beverage (pH 2.75) containing 1% juice, 500 ppm ascorbic acid, 1 ppm FD&C Red No. 40 and 10 ppm morin was prepared in a glass bottle. The beverage was then exposed to ultraviolet light in an Atlas Ci5000 Xenon Weather-Ometer (Atlas Electric Devices Co., Chicago, Ill.). The red color only began to fade at 4 hours.

COMPARATIVE EXAMPLE 2

A non-carbonated, HFCS-sweetened, benzoate- and sorbate-preserved, lemonade-flavored beverage (pH 2.75) containing 1% juice, 500 ppm ascorbic acid, and 1 ppm FD&C Red No. 40 was prepared in a glass bottle. The beverage was then exposed to ultraviolet light in an Atlas Ci5000 Xenon Weather-Ometer (Atlas Electric Devices Co., Chicago, Ill.). The red color faded to white in 1 hour.

EXAMPLE 7

A non-carbonated, HFCS-sweetened, benzoate- and sorbate-preserved, lemonade-flavored beverage (pH 2.8) containing 1.2 ppm FD&C Yellow No. 5 and 100 ppm green coffee bean extract (4.5% chlorogenic acid) was prepared in a PET bottle. The beverage was then exposed to ultraviolet light in an Atlas Ci5000 Xenon Weather-Ometer (Atlas Electric Devices Co., Chicago, Ill.). The yellow color only began to fade after 12 hours.

EXAMPLE 8

A non-carbonated, HFCS-sweetened, benzoate- and sorbate-preserved, lemonade-flavored beverage (pH 2.8) containing 1.2 ppm FD&C Yellow No. 5 and 100 ppm rosemary extract was prepared in a PET bottle. The beverage was then exposed to ultraviolet light in an Atlas Ci5000 Xenon Weather-Ometer (Atlas Electric Devices Co., Chicago, Ill.). The yellow color only began to fade after 12 hours.

EXAMPLE 9

A non-carbonated, HFCS-sweetened, benzoate- and sorbate-preserved, lemonade-flavored beverage (pH 2.8) containing 1.2 ppm FD&C Yellow No. 5 and 175 ppm rhododendron extract was prepared in a PET bottle. The beverage was then exposed to ultraviolet light in an Atlas Ci5000 Xenon Weather-Ometer (Atlas Electric Devices Co., Chicago, Ill.). The yellow color only began to fade after 12 hours.

COMPARATIVE EXAMPLE 3

A non-carbonated, HFCS-sweetened, benzoate- and sorbate-preserved, lemonade-flavored beverage (pH 2.8) containing 1.2 ppm FD&C Yellow No. 5 was prepared in a PET bottle. The beverage was then exposed to ultraviolet light in an Atlas Ci5000 Xenon Weather-Ometer (Atlas Electric Devices Co., Chicago, Ill.). The yellow color faded to white within 3 hours.

EXAMPLE 10

A non-carbonated, HFCS-sweetened, benzoate- and sorbate-preserved, lemonade-flavored beverage (pH 2.75) containing 1% juice, 500 ppm ascorbic acid, 1 ppm FD&C Red No. 40 and 100 ppm rosemary extract was prepared in a PET bottle. The beverage was then exposed to ultraviolet light in an Atlas Ci5000 Xenon Weather-Ometer (Atlas Electric Devices Co., Chicago, Ill.). The red color only began to fade after 12 hours.

EXAMPLE 11

A non-carbonated, HFCS-sweetened, benzoate- and sorbate-preserved, lemonade-flavored beverage (pH 2.75) containing 1% juice, 500 ppm ascorbic acid, 1 ppm FD&C Red No. 40 and 100 ppm green bean coffee extract (standardized at 4.5% chlorogenic acid) was prepared in a PET bottle. The beverage was then exposed to ultraviolet light in an Atlas Ci5000 Xenon Weather-Ometer (Atlas Electric Devices Co., Chicago, Ill.). The red color only began to fade after 12 hours.

COMPARATIVE EXAMPLE 4

A non-carbonated, HFCS-sweetened, benzoate- and sorbate-preserved, lemonade-flavored beverage (pH 2.75) containing 1% juice, 500 ppm ascorbic acid, and 1 ppm FD&C Red No. 40 was prepared in a PET bottle. The beverage was then exposed to ultraviolet light in an Atlas Ci5000 Xenon Weather-Ometer (Atlas Electric Devices Co., Chicago, Ill.). The red color faded to white within 4 hours.

EXAMPLE 12

A cola-berry-flavored, carbonated, HFCS-sweetened, benzoate- and sorbate-preserved, beverage (pH 3.15) containing 6 ppm FD&C Blue No. 1 and 125 mg/L rosemary extract (4.2% rosmarinic acid) was prepared in a PET bottle. The beverage was then exposed to ultraviolet light in an Atlas Ci5000 Xenon Weather-Ometer (Atlas Electric Devices Co., Chicago, Ill.). The blue color only began to fade after over 24 hours.

EXAMPLE 13

A cola-berry-flavored, carbonated, HFCS-sweetened, benzoate- and sorbate-preserved, beverage (pH 3.15) containing 6 ppm FD&C Blue No. 1 and 125 mg/L green coffee bean extract (4.5% chlorogenic acid) was prepared in a PET bottle. The beverage was then exposed to ultraviolet light in an Atlas Ci5000 Xenon Weather-Ometer (Atlas Electric Devices Co., Chicago, Ill.). The blue color only began to fade after over 24 hours.

EXAMPLE 14

A cola-berry-flavored, carbonated, HFCS-sweetened, benzoate- and sorbate-preserved, beverage (pH 3.15) containing 6 ppm FD&C Blue No. 1 and 50 mg/L *Rhododendron caucasicum* solid extract (~2% each chlorogenic acid and caffeic acid) was prepared in a PET bottle. The beverage was then exposed to ultraviolet light in an Atlas Ci5000 Xenon Weather-Ometer (Atlas Electric Devices Co., Chicago, Ill.). The blue color only began to fade after 12 hours.

EXAMPLE 15

A cola-berry-flavored, carbonated, HFCS-sweetened, benzoate- and sorbate-preserved, beverage (pH 3.15) containing 6 ppm FD&C Blue No. 1 and 175 mg/L horse chestnut extract (2.5% esculetin) was prepared in a PET bottle. The beverage was then exposed to ultraviolet light in an Atlas Ci5000 Xenon Weather-Ometer (Atlas Electric Devices Co., Chicago, Ill.). The blue color only began to fade after 15 hours.

COMPARATIVE EXAMPLE 5

A cola-berry-flavored, carbonated, HFCS-sweetened, benzoate- and sorbate-preserved, beverage (pH 3.15) containing 6 ppm FD&C Blue No. 1 was prepared in a PET bottle. The beverage was then exposed to ultraviolet light in an Atlas Ci5000 Xenon Weather-Ometer (Atlas Electric Devices Co., Chicago, Ill.). The blue color faded to white within 6 hours.

EXAMPLE 16

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 85 mg/L *Rhododendron caucasicum* solid extract (~2% each chlorogenic acid and caffeic acid) was prepared in a PET bottle. The beverage was then exposed to ultraviolet light in an Atlas Ci5000 Xenon Weather-Ometer (Atlas Electric Devices Co., Chicago, Ill.). The orange color only began to fade after 12 hours.

EXAMPLE 17

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 85 mg/L horse chestnut extract (2.5% esculetin) was prepared in a PET bottle. The beverage was then exposed to ultraviolet light in an Atlas Ci5000 Xenon Weather-Ometer (Atlas Electric Devices Co., Chicago, Ill.). The orange color only began to fade after 8-10 hours.

EXAMPLE 18

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 160 ppm echinacea extract (>3% cichoric acid) was prepared in a PET bottle. The beverage was then exposed to ultraviolet light in an Atlas Ci5000 Xenon Weather-Ometer (Atlas Electric Devices Co., Chicago, Ill.). The orange color only began to fade after 14 hours.

EXAMPLE 19

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 160 ppm hawthorne extract was prepared in a PET bottle. The beverage was then exposed to ultraviolet light in an Atlas Ci5000 Xenon Weather-Ometer (Atlas Electric Devices Co., Chicago, Ill.). The orange color only began to fade after 14 hours.

EXAMPLE 20

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 160 ppm chamomile extract was prepared in a PET bottle. The beverage was then exposed to ultraviolet light in an Atlas Ci5000 Xenon Weather-Ometer (Atlas Electric Devices Co., Chicago, Ill.). The orange color only began to fade after 7 hours.

EXAMPLE 21

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 160 ppm buckwheat extract was prepared in a PET bottle. The beverage was then exposed to ultraviolet light in an Atlas Ci5000 Xenon Weather-Ometer (Atlas Electric Devices Co., Chicago, Ill.). The orange color only began to fade after 14 hours.

EXAMPLE 22

An orange-flavored, carbonated, 10% vitamin C-fortified, HFCS-sweetened, benzoate- and sorbate-preserved, beverage (pH 3.1) containing 1 ppm FD&C Yellow No. 5, 3 ppm FD&C Yellow No. 6 and 160 ppm citrus molasses extract was prepared in a PET bottle. The beverage was then exposed to ultraviolet light in an Atlas Ci5000 Xenon Weather-Ometer (Atlas Electric Devices Co., Chicago, Ill.). The orange color only began to fade after 10 hours.

COMPARATIVE EXAMPLE 6

An orange-flavored, carbonated, 10% vitamin C-fortified, HFCS-sweetened, benzoate- and sorbate-preserved, beverage (pH 3.1) containing 1 ppm FD&C Yellow No. 5 and 3 ppm FD&C Yellow No. 6 was prepared in a PET bottle. The beverage was then exposed to ultraviolet light in an Atlas Ci5000 Xenon Weather-Ometer (Atlas Electric Devices Co., Chicago, Ill.). The orange color faded to white within 2 hours.

Other variations and modifications of this invention will be obvious to those skilled in this art. This invention is not to be limited except as set forth in the following claims.

What is claimed:

1. A food coloring composition comprising
    (a) a synthetic color selected from the group consisting of Citrus Red No. 2, D&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, ultramarine blue, ultramarine green, ultramarine violet, ultramarine red and combinations thereof; and
    (b) a botanically derived color stabilizer selected from the group consisting of chalcones, flavones, and combinations thereof,
    wherein the chalcone is selected from the group consisting of chalcone, polyhydroxychalcones, butein, phloridzin, echinatin, marein, isoliquiritigenin, phloretin and combinations thereof;
    and wherein the flavone is selected from the group consisting of rhoifolin, diosmin, apiin, apigenin, myricetin, kaempferol, luteolin, morin, neodiosmin, quercetin, rutin, balcalein, cupressuflavone, datiscetin, diosmetin, fisetin, galangin, gossypetin, geraldol, hinokiflavone, scutellarein, flavonol, primuletin, pratol, robinetin, quercetagetin, $(OH)_4$ flavone, tangeritin, sinensetin, fortunelin, kampferide, chryoeriol, isorhamnetin, vitexin and combinations thereof.

2. The food coloring composition according to claim 1, further comprising a cinnamoyl ester selected from the group consisting of cinnamyl formate, cinnamyl acetate, ethyl cinnamate, cinnamyl propionate, cinnamyl alpha-toluate, cinnamyl 2-amino benzoate, cinnamyl anthranilate, cinnamyl benzoate, cinnamyl beta-phenyl acrylate, cinnamyl butyrate, cinnamyl cinnamate, cinnamyl isobutyrate, cinnamyl isovalerate, cinnamyl methyl ketone, cinnamyl ortho-amino benzoate, cinnamyl phenyl acetate, cinnamyl 3-phenyl propenoate and combinations thereof.

3. The food coloring composition according to claim 1, further comprising coumarin selected from the group consisting of coumarin, coumestrol, dalbergin, daphnetin, esculetin, citropten, noralbergin, umbelliferone, scopoletin, xanthotoxol, psoralen, bergapten, fraxetin and combinations thereof.

4. The food coloring composition according to claim 1, further comprising isoflavone selected from the group consisting of daidzin, daidzein, biochamin A, prunetin, genistin, glycitein, glycitin, genistein, 6,7,4'-tri(OH)isoflavone, 7,3', 4'-tri(OH)isoflavone and combinations thereof.

5. The food coloring composition according to claim 1, wherein the botanically derived color stabilizer is supplied by an extract of a botanical.

6. The food coloring composition according to claim 1 further comprising a non-aryl enoic carbonyl compound selected from the group consisting of sorbic acid, aconitic acid, fumaric acid, maleic acid and combinations thereof.

7. A method of preventing color fading in a synthetically colored beverage comprising the step of including in said beverage
    (a) a synthetic color selected from the group consisting of Citrus Red No. 2, D&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, ultramarine blue, ultramarine green, ultramarine violet, ultramarine red and combinations thereof; and
    (b) a color stabilizing amount of a botanically derived color stabilizer consisting of chalcones, flavones, and combinations thereof;
    wherein the chalcone is selected from the group consisting of chalcone, polyhydroxychalcones, butein, phloridzin, echinatin, marein, isoliquiritigenin, phloretin and combinations thereof;
    and wherein the flavone is selected from the group consisting of rhoifolin, diosmin, apiin, apigenin, myricetin, kaempferol, luteolin, morin, neodiosmin, quercetin, rutin, balcalein, cupressuflavone, datiscetin, diosmetin, fisetin, galangin, gossypetin, geraldol, hinokiflavone, scutellarein, flavonol, primuletin, pratol, robinetin, quercetagetin, (OH)$_4$ flavone, tangeritin, sinensetin, fortunelin, kampferide, chryoeriol, isorhamnetin, vitexin and combinations thereof.

8. A stable colored beverage comprising,
(a) a synthetic color selected from the group consisting of Citrus Red No. 2, D&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, ultramarine blue, ultramarine green, ultramarine violet, ultramarine red and combinations thereof; and
(b) a color stabilizing amount of a botanically derived color stabilizer selected from the group consisting of chalcones, flavones, and combinations thereof;
wherein the chalcone is selected from the group consisting of chalcone, polyhydroxychalcones, butein, phloridzin, echinatin, marein, isoliquiritigenin, phloretin and combinations thereof;
and wherein the flavone is selected from the group consisting of rhoifolin, diosmin, apiin, apigenin, myricetin, kaempferol, luteolin, morin, neodiosmin, quercetin, rutin, balcalein, cupressuflavone, datiscetin, diosmetin, fisetin, galangin, gossypetin, geraldol, hinokiflavone, scutellarein, flavonol, primuletin, pratol, robinetin, quercetagetin, (OH)$_4$ flavone, tangeritin, sinensetin, fortunelin, kampferide, chryoeriol, isorhamnetin, vitexin and combinations thereof.

9. The stable colored beverage according to claim 8, wherein the synthetic color is present in an amount ranging from about 0.1 ppm to about 50 ppm.

10. The stable colored beverage according to claim 9, wherein the synthetic color is present in an amount ranging from about 1 ppm to about 10 ppm.

11. The stable colored beverage according to claim 8, wherein the botanically derived color stabilizer is present in an amount ranging from about 10 to about 500 ppm.

12. The stable colored beverage according to claim 11, wherein the botanically derived color stabilizer is present in an amount ranging from about 50 ppm to about 300 ppm.

13. The stable colored beverage according to claim 12, wherein the botanically derived color stabilizer is present in an amount ranging from about 100 ppm to about 200 ppm.

\* \* \* \* \*